US008201738B2

(12) United States Patent
Hotto et al.

(10) Patent No.: US 8,201,738 B2
(45) Date of Patent: Jun. 19, 2012

(54) ELECTRONIC VOTING SYSTEM

(75) Inventors: Robert Hotto, Carlsbad, CA (US); David Perez, San Diego, CA (US)

(73) Assignee: Energyield, LLC, Carlsbad, CA (US)

( * ) Notice: Subject to any disclaimer, the term of this patent is extended or adjusted under 35 U.S.C. 154(b) by 0 days.

(21) Appl. No.: 11/402,435

(22) Filed: Apr. 12, 2006

(65) Prior Publication Data

US 2007/0241190 A1 Oct. 18, 2007

(51) Int. Cl.
*G06K 17/00* (2006.01)
*G06K 19/06* (2006.01)

(52) U.S. Cl. ........................................ 235/386; 235/492

(58) Field of Classification Search .................. 235/386, 235/51, 50 R, 50 A, 50 B, 57, 492; 370/329, 370/338, 349; 382/123
See application file for complete search history.

(56) References Cited

U.S. PATENT DOCUMENTS

| | | | | |
|---|---|---|---|---|
| 5,412,727 | A * | 5/1995 | Drexler et al. | 713/186 |
| 5,878,399 | A * | 3/1999 | Peralto | 705/12 |
| 6,581,824 | B1 * | 6/2003 | McClure et al. | 235/51 |
| 6,607,137 | B2 * | 8/2003 | Morales | 235/492 |
| 6,694,045 | B2 | 2/2004 | Chung et al. | |
| 6,865,543 | B2 * | 3/2005 | Gibbs, Sr. | 705/12 |
| 6,892,944 | B2 * | 5/2005 | Chung et al. | 235/386 |
| 6,951,303 | B2 | 10/2005 | Petersen et al. | |
| 6,968,999 | B2 | 11/2005 | Reardon | |
| 6,973,581 | B2 * | 12/2005 | Chung et al. | 726/13 |
| 6,991,161 | B2 | 1/2006 | Pazniokas et al. | |
| 6,997,383 | B2 | 2/2006 | Kondou | |
| 7,007,842 | B2 | 3/2006 | Hawkins et al. | |
| 7,010,715 | B2 | 3/2006 | Barbas et al. | |
| 7,197,167 | B2 * | 3/2007 | Chung et al. | 382/123 |
| 2002/0134844 | A1 * | 9/2002 | Morales | 235/492 |
| 2008/0173715 | A1 * | 7/2008 | Liberman | 235/386 |

OTHER PUBLICATIONS

"National: VerifiedVoting.org Urges Support HR550 for Voter-Verified Paper Records—Still the 'Gold Standard'"; Pamela Smith, Nationwide Coordinator, VerifiedVoting.org; Apr. 4, 2006.
"Vote Spike Blamed on Program SNAFU", Anna M. Tinsley & Anthony Spangler, Star-Telegram Staff Writers, Star-Telegram.com; Mar. 9, 2006.
"Voting Machine Error Gives Bush 3,893 Extra Votes in Ohio", John McCarthy, Associated Press Writer; Nov. 5, 2004.
"N.C. House Approves New Voting Machine Restrictions", Associated Press via New and Observer; VerifiedVoting Foundation.org; Aug. 11, 2005.

(Continued)

*Primary Examiner* — Thien M Le
(74) *Attorney, Agent, or Firm* — John L. Rogitz

(57) ABSTRACT

Disclosed herein is an electronic voting system and methods, which, among other things, provides increased transparency to the public and verification for the individual voters regarding the tallying of their respective votes. A business method involves the use of general purpose computer hardware together with a software platform, made up of one or more open-source or proprietary certified software programs, including a voting software program. A voting record can be made available electronically, thereby eliminating the need to provide a voter with a paper ballot. A voting record identifier is generated without use of, or reference to, voter identity. The voting record identifier is provided to the voter, such that the voter can access a record of his ballot selections and vote number sequence. In addition, a biometric authentication mechanism is provided to reduce, or eliminate, the potential that a voter is able to vote more than once. Novel business methods further include supplying the general purpose computers to voting administrators, processing them and re-purposing the machines by placing them in the hands of eleemosynary institutions or organizations which promote or manage educational services, particularly for children.

25 Claims, 4 Drawing Sheets

OTHER PUBLICATIONS

"E-Vote Vendors Hand Over Software", Kim Zetter, Wired News; Oct. 27, 2004.

"An Introduction to E-Voting", Kim Zetter, Wired News; Jul. 7, 2005.

"Another Blow to E-Voting Company", Associated Press, Wired News; Nov. 29, 2005.

"Common Sense in Maryland", The New York Times; Mar. 23, 2006.

"Open Source Election systems Desirable, Unavailable", Jay Lyman, NewsForge; Mar. 6, 2006.

"Government and ICT Standards: An Electronic Voting Case Study", Jason Kitcat, Info. Comm & Ethics in Society; 2004.

"Voting Process Too Important to Leave to Technology", Andrew Kantor, CyberSpeak; Dec. 15, 2003.

"Main Said to Expose Voting-Machine Maker Faces Felony Charges", Associated Press, San Diego Union-Tribune; Mar. 19, 2006.

Letter from Noah T. Winer of MoveOn.org urging Congress to retain hardcopy back up of voting records; dated Apr. 10, 2006.

* cited by examiner

ELECTRONIC VOTING SYSTEM

BACKGROUND OF THE DISCLOSURE

The present invention relates to improved systems for collecting, authenticating and tallying voter data. In particular, the present disclosure offers for consideration new electronic voting systems, methods and processes to overcome drawbacks of the prior art.

Voting is a cornerstone of democracy. In order to maintain the values of a free society, those participating in the process need to see and understand how their efforts matter. The presidential election of 2000 highlighted, to the public, many problems associated with mechanical voting systems. The election is remembered neither for any substantive policy nor historically significant political issues, rather for the now infamous controversy surrounding hanging chads and multiple recounts. Consequently, confidence in the ability of the government to administer elections was substantially eroded. Likewise, a new series of desiderata for the enfranchised were brought into the public awareness.

Many states took notice of the problems associated with mechanical voting systems and responded by examining and, in some instances, installing new types of units, including electronic voting machines. However, there are problems associated with the adoption and use of electronic voting machines. One such problem concerns the significant monetary investment. Since most jurisdictions use mechanical voting systems, the adoption of electronic voting machines requires the purchase of all new equipment. Economic efficiency militates against this solution. However, as the opportunity to use improved technology expands the range of choices, new solutions become feasible.

In addition to the significant costs associated with replacing mechanical voting systems and with the purchasing of electronic voting systems, concerns have been raised about the trustworthiness of electronic voting systems. A primary question raised is whether or not the electronic voting systems, or their suppliers, can be trusted to provide the technology needed to accurately record each voter's vote. Commercial interests, partisan politics and conflicts of interest ostensively exist to cloud these issues. Public confidence is an essential element and remains sorely lacking today, hence the need for improvements and better systems.

In fact, there were reports of alleged voting miscounts and voting fraud in connection with the use of the available machines for the 2004 election. The alleged incidents might be considered to be more egregious than those that occurred in 2000. For example, the applicable literature reflects the existence of reports alleging use of a vendor's electronic voting systems in an election prior to the system being certified by the state. Similarly, reports of tampering and unauthenticated, or untallied, votes were made.

The number of these negative reports coupled with the lack of "openness" of the technology (i.e., most, if not all, electronic voting systems use proprietary technology, which is not open to public examination), has led to a mistrust of the prior art electronic voting technology, and the specific electronic voting machines used. No sufficient degree of improvements has been forthcoming, leading to the conclusion that longstanding needs remain to be addressed.

One interesting response to stated concerns associated with the use of electronic voting systems, a private Australian company designed an Electronic Voting and Counting System, or eVACS, which is based on a set of specifications established by election officials. The software program code developed by the company was posted on the Internet for public review and evaluation. Members of the public responded and even identified bugs in the system. In addition, an independent company was hired by the election commission to audit the system. As post-election verification, a manual count was conducted to evaluate the system's accuracy.

Australia's eVACS included voting terminals consisting of a personal computer, with each voting terminal connected to a server at the same polling place via a secure local area network. A barcode, which does not identify the voter, is supplied by the voter and read by eVACS, before the voter is authorized to cast his vote. The voter "swipes" the barcode over a reader to reset the machine, enters his vote, and then "swipes" the barcode over the reader again to cast his vote.

As part of the eVACS design, the polling place server saves two copies of the votes cast using the voting terminals on separate discs. Each copy of the voting data is digitally signed and delivered independently to a central counting location. As a mechanism to determine whether the voting data has been tampered with, two different digital signatures are generated from the voting data. The first digital signature is generated from the voting data prior to its transmission to the central counting location, and the second digital signature is generated from the voting data once it is received at the central location.

The two digital signatures are compared to determine whether the voting data was altered. That is, if the data is altered after the first digital signature is generated, the second digital signature will be different from the first, which could indicate that the voting data was altered, or tampered with, prior to its receipt at the central counting location.

One shortcoming with this system is that the eVACS design used in Australia did not include a mechanism for allowing the voter to print, review and verify the ballot. The added expense associated with placing printers at each polling location was cited as one reason for not including this aspect in eVACS. The primary reason cited, however, was the expense associated with the added personnel needed to ensure that the paper receipts were deposited in a secure ballot box, and were not removed from the polling location, inadvertently or otherwise. This only serves to underscore the longstanding needs for a system that voters can understand and support.

The present disclosure addresses problems associated with existing mechanical and electronic voting systems, including those mentioned above, and provides a level of transparency and economic advantage. For this reason, it is believed to constitute progress in science and the useful arts, for which Letters Patent are hereby expressly requested.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

SUMMARY

Figure 1:
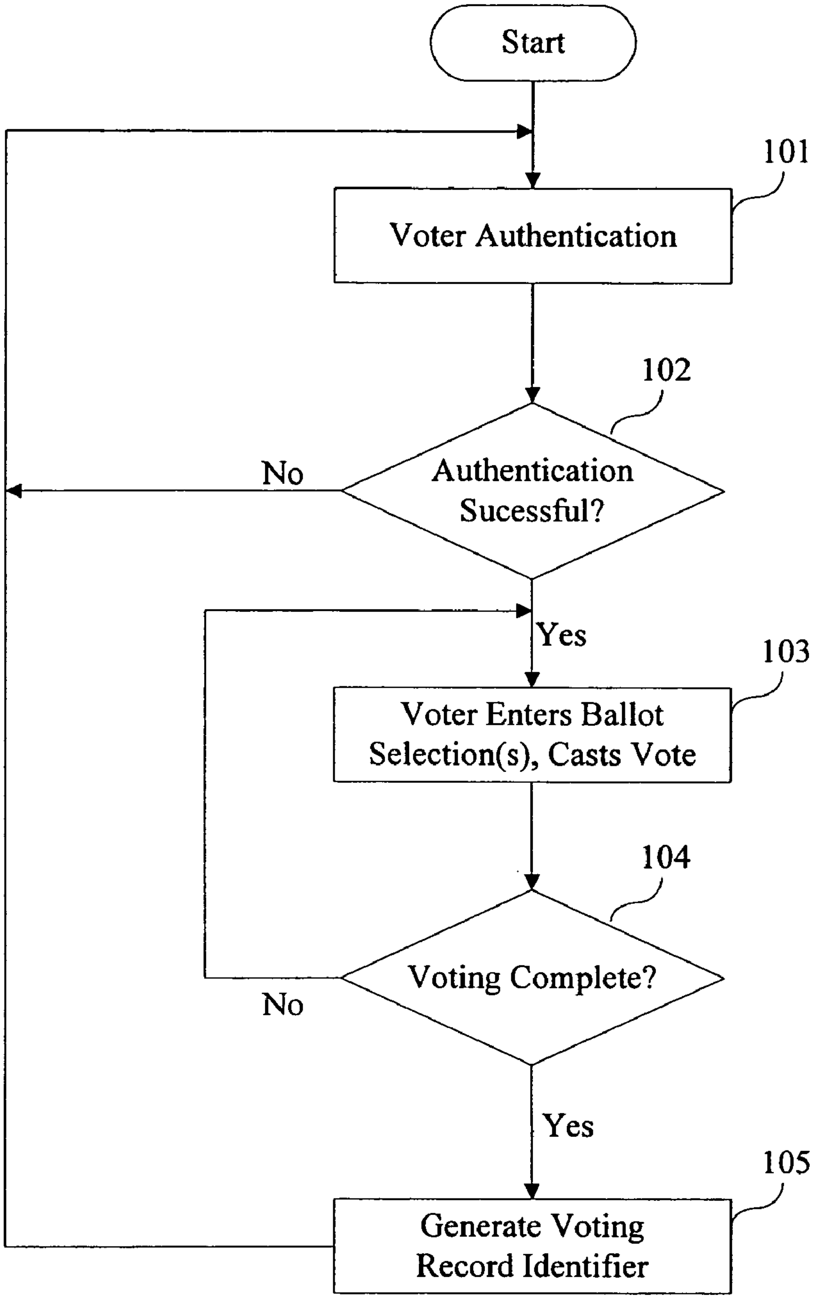
FIG. 1 provides an example of an electronic voting process flow in accordance with at least one embodiment of the present disclosure.

Disclosed herein is an electronic voting system and methods which, among other things, provide increased transparency to the public and verification for the individual voters regarding the tallying of their respective votes. A series of business methods is also disclosed. Among these methods are those which involve the use of general purpose computer hardware together with a software platform made up of one or more open-source or proprietary certified software programs, including a voting software program. A voting record can be made available electronically, thereby eliminating the need to provide a voter with a paper ballot. A voting record identifier is generated without use of, or reference to, voter identity.

The voting record identifier is provided to the voter, such that the voter can access a record of his ballot selections and vote number sequence. In addition, a biometric authentication mechanism is provided to reduce, or eliminate, the potential that a voter is able to vote more than once. Novel business methods include supplying the general purpose computers to voting administrators, processing them and repurposing the machines by placing them in the hands of eleemosynary institutions or organizations which promote or manage educational services, particularly for children. Likewise, additional features for those individuals who are challenged physically or mentally serve to provide access to the polls for all.

Among other things, the present disclosure teaches methods, including business methods, of providing electronic voting systems, comprising computing systems having voting software, using the electronic voting systems in at least one election to collect votes. After at least one election, the computing system is then made available for use by the public, such that the public's use of the computing system is other than in an election.

By virtue of this arrangement, the public has an opportunity to become familiar with the technology used in an electronic voting system, and is more apt to trust and certify the technology. Likewise, public trust and confidence are bolstered by the visibility of the system and its charitable purpose further reinforces this perception.

In at least one embodiment, the electronic voting system is comprised of a general purpose computer system, which is made available to the public, for example, at some time before or after an election. Thus, unlike proprietary dedicated voting systems, the public has an opportunity to thoroughly investigate the computer system.

In accordance with one or more embodiments, the electronic voting system's software platform is redeployed after each election, and replacement equipment is used in the next voting cycle. By virtue of this arrangement, older equipment, and perhaps older technology, is retired and newer equipment, and newer technology, can be used in each election, which can increase reliability and eliminate storage costs.

Advantageously, according to the teachings of the present disclosure, a vendor, or supplier, reaps some benefits, thereby creating an incentive for the vendor/supplier to supply the hardware and/or software platform for the electronic voting systems. For example, the supplier's products receive brand name recognition with the public. The supplier can even introduce a new model to the public and/or have access to a segment of the market, by virtue of its use in an election. The supplier can receive good will benefits/recognition by supplying technology used in an electronic voting system. In addition and in a case that the supplier provides refurbished equipment for use in the hardware platform, the supplier can reduce the inventory of such equipment, while still providing a benefit to the public. The supplier can either sell or donate the equipment for this purpose, such that the supplier can receive revenue and/or achieve certain tax breaks by supplying the refurbished equipment. Chain of custody issues and status of devices used and repurposement and/or redeployment are likewise essential to and addressed by the instant disclosure.

In accordance with another aspect disclosed herein, an electronic voting method receives ballot selections as input from a voter and causes the input to be saved as voting data. A voting record identifier is generated, whereby as previously never done, the voting record identifier can be used to identify a voter's ballot selections without reference to the voter, or his identity. The voter ballot selection input is saved and transmitted to a central database, together with the generated voting record identifier, and an association between the voting data and the voting record identifier.

By virtue of this arrangement, a voter can anonymously access his or her ballot selections, in order to review and confirm the entry and accuracy of the ballot selections. The voter can access the ballot selections electronically, such as over the Internet, for example. Thus, the need for printers and printed/paper ballots can be eliminated. Therefore, there is no need to have additional poll workers to police the paper ballots, thereby avoiding, or greatly reducing, the costs associated with a poll location. Utility is further driven by this added economic incentive.

In accordance with features and teachings of the present disclosure, the voting record identifier includes information which identifies a voter's voting sequence relative to the other voters. Thus, the voter can determine the order in which his vote was "counted" relative to the other voters.

By using a feature of the present disclosure, there is taught an electronic voting system which comprises at least one server, coupled to a plurality of computers, for use as an electronic voting system, which comprises computer devices and electronic voting software packages in which electronic voting systems are linked by a computer network, wherein at least one server receives ballot selections as input from a voter, using code to cause the input to be saved as voting data and code to save and associate the voters ballot of selection together with a generated voting sequence number without reference to the voters personal identification.

Also disclosed is a method of marketing a supplier's products, such that the supplier provides the goods, e.g., a general purpose computer, to a jurisdiction for use in one or more elections, and allowing the machines to be donated, or sold, to a public entity after the one or more elections.

Another aspect discussed herein concerns voter authentication, wherein a voter is authenticated so as to reduce, or eliminate, the possibility of a voter exercising his or her right to vote more than once. Authentication information, such as biometric information, received from a voter is compared to previously saved biometric authentication information. A notification is generated authorizing the voter to cast a vote in the case that the received authentication information does not match stored authentication information.

In the case that received authentication information does match stored authentication information, authorization is denied and a notification is generated to indicate that the received authentication information matches stored authentication information. The authentication information comprises information that can uniquely identify a voter, such as biometric information, for example.

Therefore, according to embodiments of the present disclosure, a method comprising the steps of providing an electronic voting system is disclosed. According to this method, the electronic voting system comprising a computing system and electronic voting software, to collect votes using the electronic voting system in at least one election, at least the computing system is made available for use by the public after the subject election, wherein the public's use of the computing system is other than in an election.

According to another embodiment of the present disclosure, a system is provided comprising at least one server coupled to a plurality of electronic voting systems via a computer network, the subject server comprising a processor and program memory. According to this other and further method, the program memory for storing program code, comprising code to receive ballot selections as input from a voter and a code to cause the input to be saved as voting data, are disclosed.

According to yet another embodiment, a marketing method is provided comprising the steps of supplying at least one computer to a voting jurisdiction, with at least one computer having a software platform including electronic voting software and selling the computers after an election ends is taught.

Another embodiment of the present disclosure is for a voter authentication. This method is provided which includes getting authentication information for a voter, the authentication information comprising biometric information and comparing the received authentication information with previously stored authentication information, the stored authentication information comprising biometric information and generating a notification to indicate that authentication was successful, and storing the received authentication information, in a case that the received authentication information does not match stored authentication information and to generate a notification that authentication failed in a case that the received authentication information matches stored authentication information.

Likewise, according to the present disclosure there is provided a voter authentication method receiving authentication information for a voter comparing the received authentication information with all stored authentication information gathered during the election. A notification is then generated to indicate that authentication was successful, and storing the received authentication information, in a case that the received authentication information does not match stored authentication information generating a notification that authentication failed, in a case that the received authentication information matches stored authentication information preventing the unauthenticated individual to execute a vote.

With another embodiment of the present disclosure, an electronic voting method is provided which is comprised of receiving ballot selections as input from a voter, causing the input to be saved as voting data and generating a voting record identifier for identifying the voter's ballot selections, without reference to voter identification information, storing the voting data, the generated voting record identifier, and an association between the voting data and the generated voting record identifier.

In still another embodiment of the present disclosure, a business method is provided for leveraging electronic voting to create economic efficiencies advantages to the public, advantages to business suppliers and visibility to the voters of anonymous, albeit accurate, vote tallying the improvement which comprises supplying a general purpose computer to the officials of a voting precinct and employing the general purpose computer for a voting set-up and voting process and processing the general purpose computer by at least one of removing, updating and otherwise rendering said computer effective for general purpose.

According to yet another feature, a novel enhanced process for electronic voting, is taught comprising, in combination, providing a multiplicity of computers operatively coupled to at least one of a local, regional and national server to receive ballot selections as input from voters, saving user input as voting data, further comprising ballot selections associating each voter's ballot selections with a voting sequence number. The next step is authenticating each voter's information by comparing the same to stored voter data further comprising voter biometric information, generating a voting local sequence number, comprised of a data set which is a combination of time and a computer associated with a voter's ballot selection input, and, prioritizing local sequence number and a geographic location of the voter's voting sequence relative to other users.

According to still another and further feature of the present disclosure, there is provided a business method for encouraging voter participation in an election, which is comprised of making a general purpose computer system networked with local, regional and national server systems and equipped with voting software available to a governmental body, thus, creating incentives in terms of discounts with downstream usages of the general purpose computers.

Briefly stated, an electronic voting system and method is disclosed, which among other things provides increased transparency to the public and verification for the individual voters regarding the tallying of their respective votes. A business method involves the use of general purpose computer hardware together with a software platform, made up of one or more open-source or proprietary certified software programs, including a voting software program. A voting record can be made available electronically, thereby eliminating the need to provide a voter with a paper ballot. A voting record identifier is generated without use of, or reference to, voter identity. The voting record identifier is provided to the voter, such that the voter can access a record of his ballot selections and vote number sequence. In addition, a biometric authentication mechanism is provided to reduce, or eliminate, the potential that a voter is able to vote more than once. Novel business methods include supplying the general purpose computers to voting administrators, processing them and repurposing the machines by placing them in the hands of eleemosynary institutions or organizations which promote or manage educational services, particularly for children.

DETAILED DESCRIPTION

The present inventors have realized that general purpose computers, such as laptop computers, tablet computers (with touch screens) and the like, can be used to address and overcome many of the existing problems with voting systems.

The present inventors have realized a series of improvements over conventional voting systems that shall substantially bolster public confidence, while adding reliability and economic efficiencies in unprecedented ways. In accordance with one or more embodiments, an electronic voting system is provided, which includes a plurality of electronic voting systems, which are connected to one or more servers via a network (e.g., local area network, wide area network, the Internet, and related systems). In accordance with at least one embodiment, electronic voting systems are located at polling places, and provide voters with an interface to the electronic voting system, so as to record a voter's voting selections as input.

Public monies are saved, polling issues are addressed, and reliability likewise restored to an essential aspect of democratic societies. Since the public has visibility to, and awareness of how the system works, voting can once again become an abject positive, while saving tax-payer money. Expressly incorporated here are U.S. Pat. Nos. 7,010,715; 7,007,842; 6,968,999; and, 6,669,045, as if they were fully set forth herein.

Each electronic voting system comprises a general purpose computer (e.g., a personal computer) as a hardware platform, onto which is installed a software platform including voting software. In one or more embodiments disclosed herein, the general purpose computer is the same or similar to a personal computer, or other computing device, that currently is, or will be, available to the general public or is already in use by members of the general public. Use of a general purpose computer known to the general public is more likely to instill trust than a proprietary system, such as a special purpose computer system which has a single, dedicated use, and which is only available to the general public for a limited time (e.g., at election time).

In accordance with one or more embodiments, the voting software can be open-source or certified proprietary voting software which allows voters to cast votes among one or more candidates. Voters can enter their selections using one or more I/O devices, including those described herein, or by other devices, such as a Braille terminal or voice recognition and output subsystem for physically-challenged persons. The voting software receives voter selections as input, processes each input selection, and stores the voting data in persistent storage, e.g., on a storage media, such as a magnetic disk. Data may be stored on other storage media together with or instead of a magnetic disk, such as flash-based media. In one or more embodiments, the voting data can be stored on a server local to the polling place, a server located in a remote (or central) location, or both. In addition and in accordance with at least one embodiment, multiple copies of the voting data are maintained, with at least two copies being stored using independent storage media at different locations, so as to achieve a level of redundancy. It should be apparent that additional or other storage schemes can be used to achieve redundancy.

While the present disclosure is not limited to its use, open-source voting software can provide a level of transparency, which can result in a greater level of trust by the public in an electronic voting system. For example, open-source voting software provides an opportunity for the public to review the software program code, in order to determine whether or not the program code is functioning properly to record and count votes. Open-source software can achieve a level of transparency, since it is freely available to the public. Thus, use of open-source software in an electronic voting system can instill trust and address concerns of many critics with respect to transparency.

Open-source software can have other advantages. For example, a certification body, e.g., an election commission, can have access to the open-source software for evaluation and certification prior to the software being used in an election. Since the software is freely available and accessible, the evaluation and certification process can occur at anytime prior to using the software in an election, which can result in the most recent, and up-to-date, version of the voting software being used. In addition and with open-source voting software, there may be a degree of flexibility in the hardware platforms and operating systems that can be used. Open-source voting software can also provide an opportunity for jurisdictions (e.g., county, city, country, etc.) to modify the software to accommodate special, or customized, specifications and/or requirements.

In addition to the voting software, in one or more embodiments, the software platform can include other software, some or all of which can be otherwise known and/or available to the public. For example, the software platform can include an operating system common in the art, such as a Microsoft Windows operating system, a UNIX-based operating system, a LINUX-based operating system, a Macintosh-based operating system, or another operating system that is commonly used on computer systems. In other embodiments, the operating system can be a specially written, open-source or proprietary operating system specifically designed for electronic voting systems. Some jurisdictions may require that all software components on an electronic voting system be open-source software, and in such a case an appropriate open-source operating system may be chosen, such as LINUX or Free-BSD UNIX-based operating system. Other examples of software installed on the computer may include without limitation voter identification and authentication software, data encryption, etc.

The general purpose computer can be any type of computer, including without limitation a laptop computer, a tablet computer, a desktop computer, etc. The electronic voting system can use any type of input/output device, including a touch screen, digitized tablet or pad, pressure-sensitive pad, mouse, keyboard, keypad, scanning device, printer, Braille terminal, etc. In accordance with one or more embodiments, additional hardware and/or software can provide the capability to accommodate a voter's special needs (e.g., hearing, eyesight, etc.), be they physical, mental or otherwise.

In accordance with at least one embodiment, some number of electronic voting systems, each of which comprises an electronic voting platform comprising a hardware platform and a software platform such as that described herein, are supplied to a voting precinct in a city or county, for example. In at least one embodiment, an electronic voting system is supplied (e.g., sold with or without a discount, as part of a loaner program, pursuant to a lease or rental agreement, etc.) for use by the voting precinct for a given period of time, which can span a number of years, a number of elections, etc. In accordance with at least one embodiment, the time period can include a period of time used for setup (e.g., pre-election setup) and/or post-election verification activity.

Upon expiration of the time period, an electronic voting system is retired, and can be earmarked for a "second use," or some subsequent use. One example of such a use concerns review and analysis, e.g., quality control, of the electronic voting system. In accordance with this use, an electronic voting system is supplied to an entity for purposes of investigating and testing the electronic voting technology (e.g., hardware and/or software platform) used in an election. The entity can be a member of the general public, or an entity whose findings can be disseminated to the general public. By making the hardware and software that was used in an election available for examination and testing, it is possible that the public's trust can be increased.

Another example of a use involves donating or selling (e.g., with or without a discount) the general purpose computers to entities, some of which might otherwise not be able to acquire such computing equipment. Examples of such entities include without limitation an educational institution, public library, youth organization, rehabilitation center, governmental agency, member of the public, etc. Prior to distribution and in accordance with one or more embodiments, the general purpose computer can be returned to the manufacturer for resale, examples of which can include without limitation hardware and/or software upgrades. In addition, the voting software can be erased from the computer's storage. Alternatively, the voting software can be left on the computer, in order to allow access to the technology. In so doing, the general public's access to the technology is increased; this can result in further trust and/or authentication of the technology.

Alternatively, a supplier can provide recycled equipment to be used in the hardware platform. In such a case, the supplier can sell (e.g., with or without a discount), donate, or otherwise transfer (e.g., lease, loan, etc.) at least the equipment for this purpose. In any case, the supplier is able to reduce inventory, while still being able to generate revenue, and/or obtain certain tax breaks associated with supplying the recycled equipment.

It is likewise contemplated in embodiments in which the electronic voting systems are retired after each election, there is no need to reserve (and pay for) storage space for the equipment between elections. As an alternative to storing the electronic voting systems, during the time when they are not being used for elections, the computers could be loaned out to an entity, such as a local school for to enhance the education process and avoid the necessity of having the election commission store the computers until the next election. Thus, the computers can be put to more than a periodic use. When not in use for election purposes, the voting software could be removed. Alternatively, the software can be left on the computer to educate the public in its use, and to allow the public to evaluate the software, for example.

In addition to a benefit to the public, there are also benefits, and/or incentives, for a vendor, or supplier. In at least one embodiment, a method of generating revenue is contemplated, which can benefit a vendor who supplies some or the entire electronic voting platform. Revenue streams may be induced in the form of increased sales from the good-will recognition, in the form of tax incentives, or in other ways of increasing the profits of a business. The use of a new computer for voting also provides the public with a "test drive" of a new computer model, as an analogy to car companies paying or giving incentives to potential customers to "test drive" a new car model. Visibility of the inner workings to the public is essential and accomplished according to the instant teachings.

To further illustrate, use of a supplier's equipment as part of the electronic voting platform (e.g., the supplier of the general purpose computer) can have advantages, such as brand name recognition, marketing and/or advertising advantages. In addition, the supplier can use this as an opportunity to introduce a new model of the supplier's equipment to the general public. The supplier might even be able to reach, or more easily reach, a segment of the market that the supplier might otherwise not be able to reach.

In accordance with at least one embodiment, in order to provide a failsafe system and conform to the laws of some precincts, the voting software may produce one or more hardcopy records of each voter's ballot. The hardcopy record can be verified by each voter prior to departing the voting booth or the voting site. Hardcopy voter results can be used to verify accuracy of the electronic voting systems and voting software. Moreover, in the event of a mechanical failure, the hardcopy record can be manually counted to preserve the votes. Similarly and as discussed herein, a layer of fail-safe protection can be built into the system such that voting results can be obtained by counting the votes contained in a backup copy of the voting data, such as a backup copy stored on a server or in a central database maintained by a server.

In addition, or as an alternative, to using paper ballots or receipts, embodiments of the present disclosure contemplate use of an electronic copy of a voter's voting record accessible via a unique voting record identifier. In accordance with one or more embodiments of the present invention, a database (e.g., database 402 shown in FIG. 4) is maintained, which contains a record of the votes cast and an associated voting record identifier. A voter is given read-only access to the database and can retrieve a voting record using the associated unique voting record identifier. Thus, a voter who possesses the unique voting record identifier associated with a voting record can access and review the voting record. In addition and in accordance with one or more embodiments disclosed, the voting record identifier provides sequence information which can be used to identify a sequence of a voter's vote relative to the other voters who voted in an election. Thus, the voting record identifier can be used to retrieve a voter's voting record for a given election in order to determine whether the retrieved voting record accurately represents a voter's ballot selections. In addition, the voting record identifier provides a voting sequence, such that a voter can locate his vote in a sequence of votes cast in an election. The information contained in database 402 can be used to confirm a vote count, e.g., as part of a post-election audit.

In accordance with at least one embodiment, the voting record identifier comprises a confirmation code and a sequence identifier. The confirmation code can be used to access the voter's voting record, and the sequence identifier represents an order in which a given voter cast his vote relative to all of the other voters, e.g., the sequence identifier identifies a given voter as the eighteen-millionth voter to cast a vote. In one or more alternate embodiments, the voting record identifier comprises a sequence identifier which is unique, and which serves to provide both the confirmation code and the voter sequence information.

In accordance with one or more embodiments which contemplate the use of a unique voting record identifier given to each voter, e.g., displayed by the electronic voting system before the voter completes a voting session, there is no mapping between the voter's actual identity and the voting record identifier. By using an anonymous identifier associated with the voter's voting record, there is less, or even no chance, that a voter can be linked to the voter's ballot selections, thereby allowing the voter's voting record to remain secret. Each vote cast by a voter is mapped to the unique voting record identifier.

Figure 4:
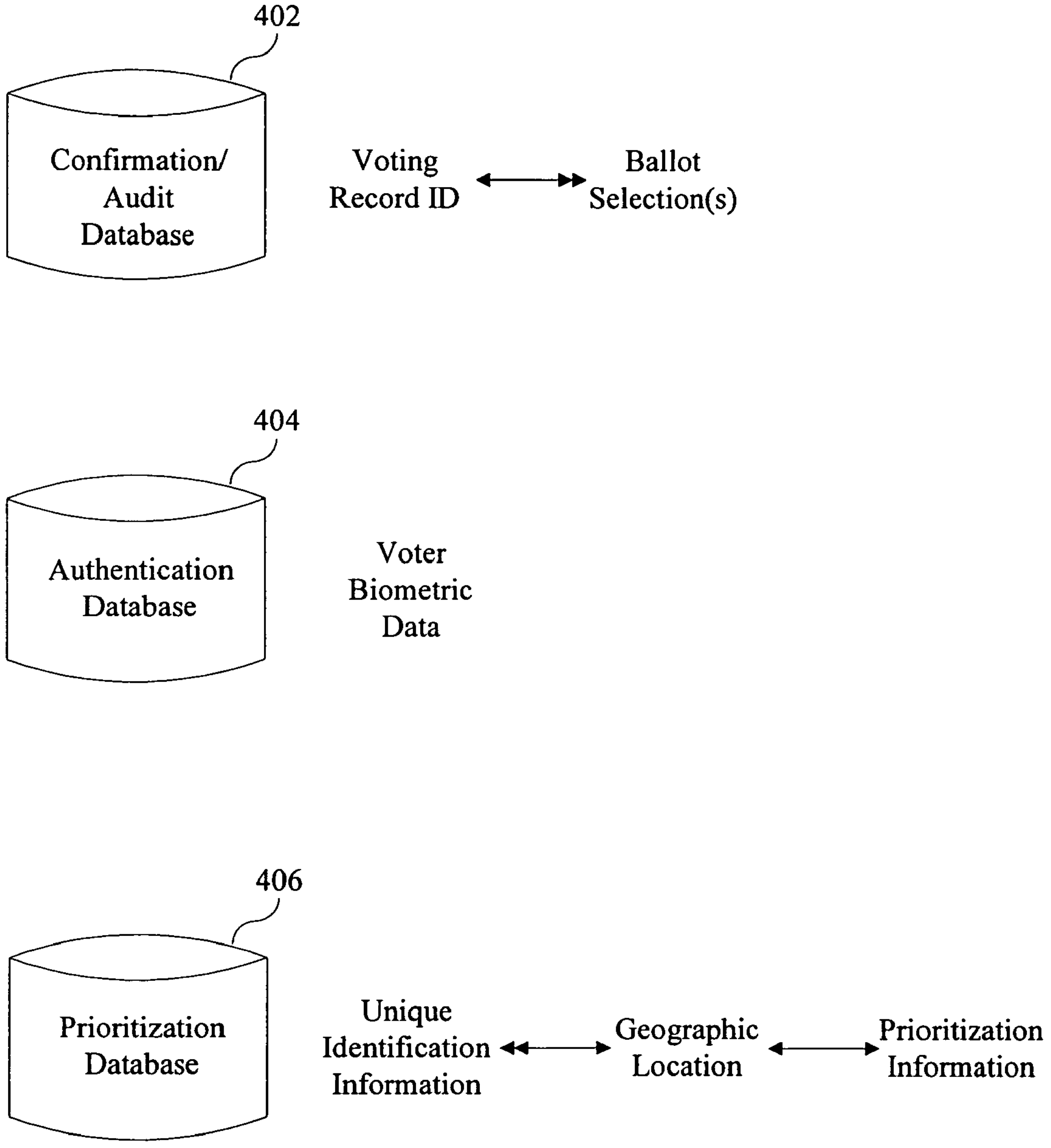
FIG. 4 provides examples of data stores used to store information used in an electronic voting process in accordance with one or more embodiments of the present disclosure.

The voting record identifier, each voter's voting data and a mapping between the voters's voting record identifier and voting data can be maintained by a centralized database management system, for example. The voting record identifier can be generated and controlled by one or more trusted server systems. FIG. 4 provides an example of various databases, or data stores, one of which is database 402. Database 402 includes one or more voting record identifiers, and the ballot selections associated with each voting record identifier. Copies of database 402 can be replicated to more than one location, and accessed via a network (e.g., local area network, wide area network, the Internet, etc.). Once it is generated, the voter can use the voting record identifier to call up a record of the votes cast by the voter, to ensure that his ballot selections have been accurately received and recorded.

In accordance with one or more embodiments, a voting record identifier comprises a sequence identifier which is unique for each voter. The sequence identifier is based on a time that a voter voted. It is anticipated that two or more voters can cast their votes at the same time. Accordingly, and in order to generate a sequence identifier that is unique for each voter, database 406 can be used to identify a voting order in a case that two or more voters are determined to have cast their vote at the same time. The identified voting order can be used to generate a sequence identifier. Database 406 will be discussed in more detail herein and with reference to FIG. 3, and is set forth in the claims appended hereto, mindful that it is defined for this specification as artisans would understand to mean a set of data structures, the genus of which could alternately be manifested in electronically driven or alternate mechanisms.

In one or more embodiments of the invention, database 404 retains a record that a voter has voted in order to prevent a voter from voting more than once. In order to maintain the secrecy of a voter's voting record, embodiments of the invention maintain database 404 separate from database 402. Again, computer systems enhanced by the instant teachings as set forth herein merely embody a species of the larger suspect of assemblies of data structures referred by embodiment 406 of a database.

The data used to authenticate a voter is information that uniquely identifies the voter. One example of such information is information stored in the magnetic strip of the voter's driver's license. Another example is biometric information, which can include without limitation one or more of fingerprint information, palm print information, facial pattern information, eye scan information, and/or hand measurement information, which can then be compared to previously obtain biometric information stored in an independent system. The biometric data would not be stored in conjunction with the cast ballots, nor should it be gathered as a prerequisite to voting; the sole use of biometric data is to verify the identity of the voter and prevent voter from casting multiple ballots.

Figure 2:
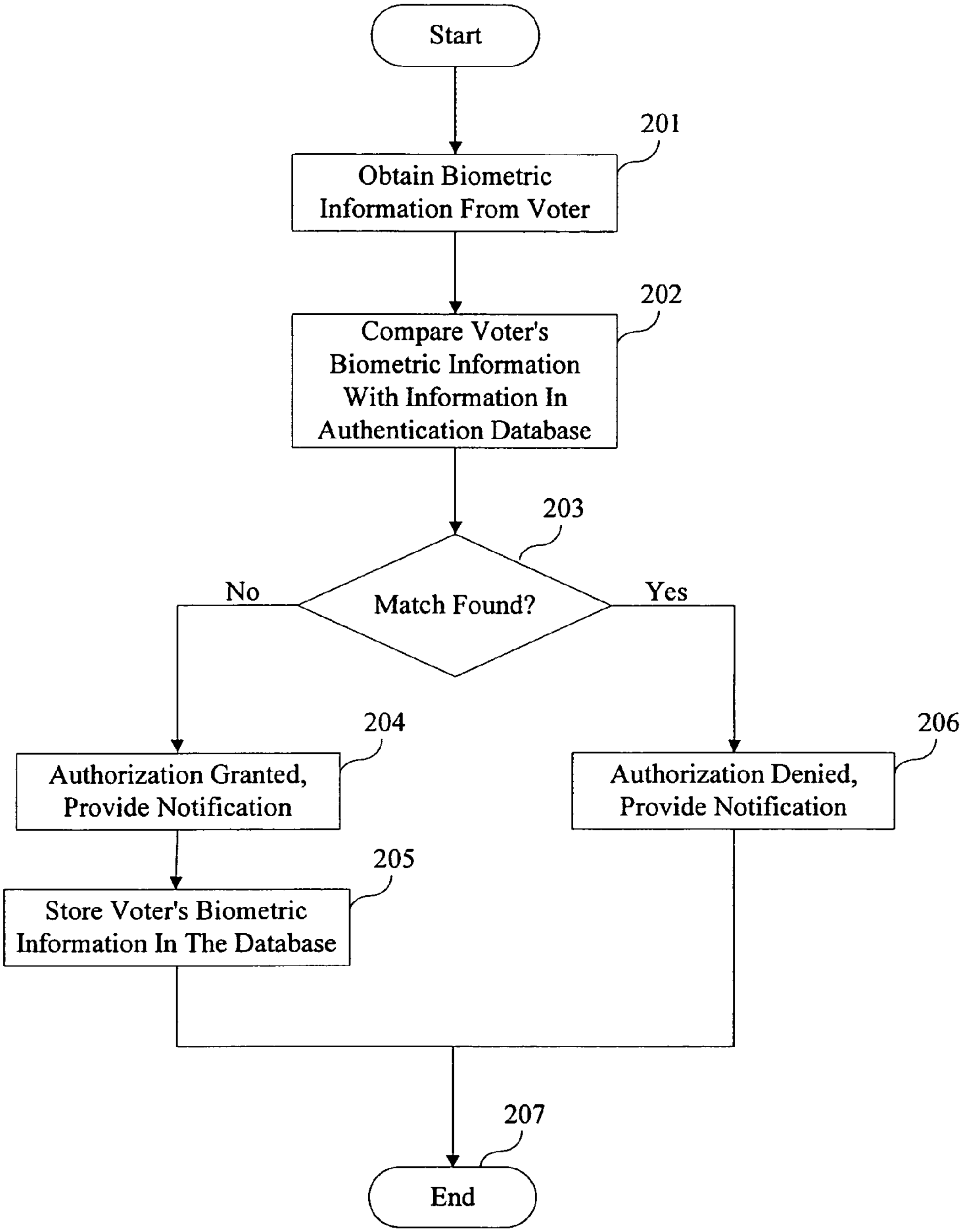
FIG. 2 provides an example of a voter authentication process flow for use in one or more embodiments of the invention.
Figure 3:
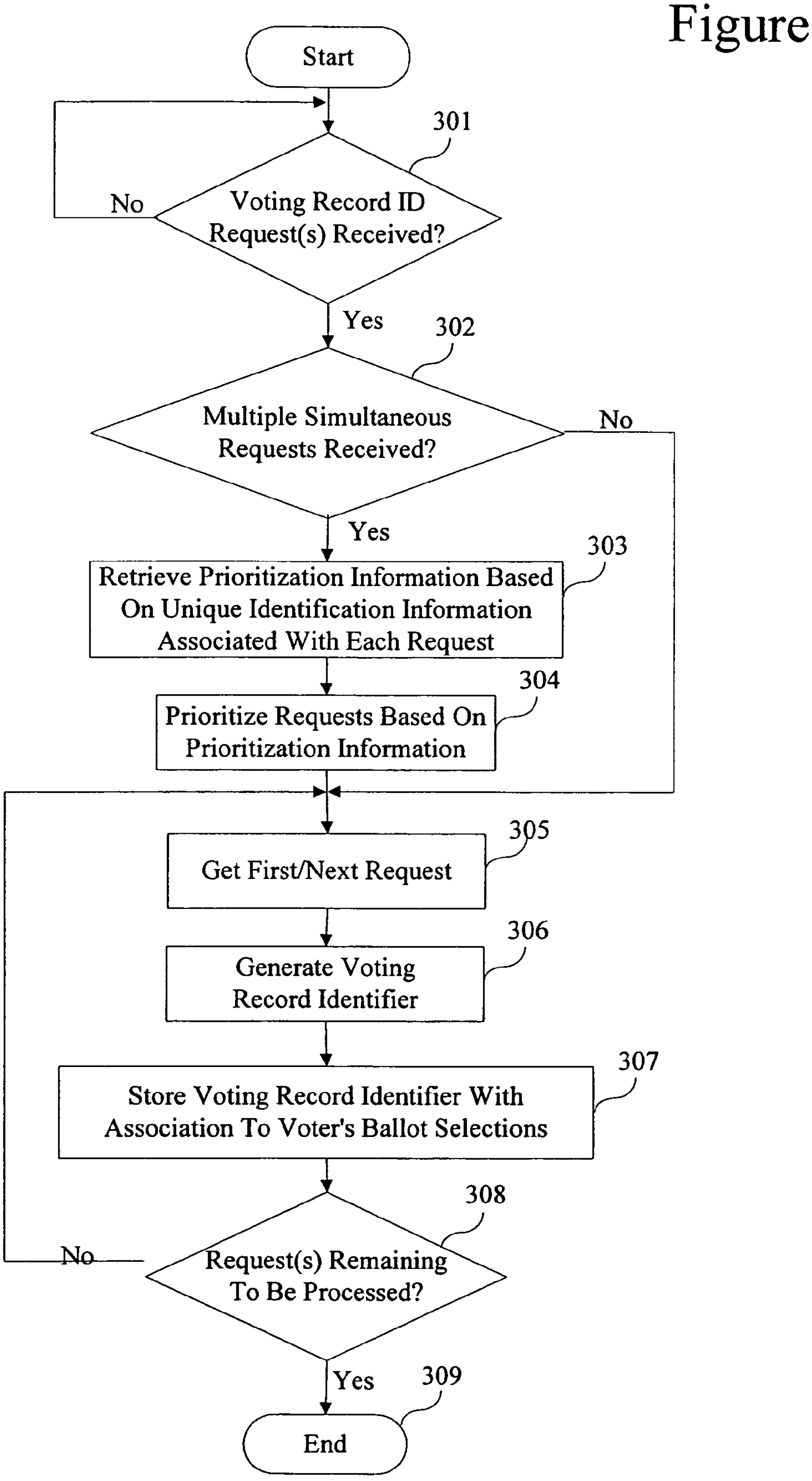
FIG. 3 provides a voting record generation process flow for use in one or more embodiments of the present disclosure.

FIGS. 1 to 3 provide a non-limiting and merely illustrative example of an electronic voting process flow for use with one or more embodiments disclosed herein. Those skilled in the art will understand steps that can be substituted for that which is illustrated. These figures show how, in accordance with one or more disclosed embodiments, a voter is authenticated prior to his casting a vote, in order to determine whether or not the voter has already voted in the current election (e.g., is attempting to cast more than one ballot). In accordance with embodiments disclosed herein, if a voter has already voted, his biometric information will be compared to data in an independent database recording the identity of voters, but not the votes cast by each voter.

As discussed above and claimed below, in accordance with disclosed embodiments, if a voter's biometric information is found to match stored biometric information, a determination is made that the voter has already cast his ballot. In such a case, for example, where authentication will fail, and the appropriate personnel (e.g., poll worker, election official, law enforcement, or some after-developed mechanism which is fuictionally analogous), can be notified. Thus, voter authentication can be used to reduce the possibility that a voter will be able to vote more than once in a given election.

If authenticated, the voter enters his ballot selections using an electronic voting system, as described herein. Once the voter has finished entering ballot selections, the voter can signal completion (e.g., selecting a "Cast My Vote" button of an interface of the electronic voting system). A voting record identifier is then generated, which generated identifier can be used by the voter to access his ballot selections, and/or identify his vote in a voter sequence.

More particularly and with reference to FIG. 1, at step 101, a voter authentication is performed before a voter is given authorization to cast his vote. Voter authentication is discussed in more detail herein and with reference to FIG. 2. If the voter authentication is determined to be unsuccessful at step 102, the voter is not authorized to vote and processing continues at step 101 for another voter. If it is determined, at step 102, that the voter was successfully authenticated, processing continues at step 103, to allow the voter to access his ballot via an electronic voting system and to receive input from the voter, including ballot selections. At step 104, a determination is made whether or not the voter has indicated that he is finished voting. If not, processing continues at step 103 to receive further input from the voter.

If it is determined, at step 104, that the voter is finished voting, processing continues at step 105 to generate a voting record identifier. A process for generating a voting record identifier in accordance with at least one embodiment is described in more detail herein and with reference to FIG. 3.

Referring now to FIG. 2, an example is provided of a voter authentication process flow for use in one or more embodiments of the invention. At step 201 of FIG. 2, biometric information of the voter is obtained for comparison to previously stored biometric data. For example and in a case that the biometric information is a fingerprint, a fingerprint scanning device is used to input the voter's fingerprint for authentication. Of course, it should be apparent that another type of biometric information can be used in place of, or as an alternative to, a fingerprint. In addition, it should be apparent that a voter can be authenticated using more than one type of biometric information in combination, e.g., a fingerprint and an eye scan.

At step 202, the biometric information provided by the voter is compared to a database, e.g., database 404, which contains previously obtained biometric information supplied by voters, and used for voter authentication, in the current election. In addition, it should be apparent that any of a number of techniques can be used to compare the biometric information to locate a match, provided the ballots and verification systems operate independently of each other to prevent issue of invasion of privacy.

Referring to FIG. 4, authentication database 404 is an example of a database which includes biometric information supplied by the voters for comparison to previously obtained biometric data. In accordance with at least one embodiment, authentication database 404 contains biometric information only. As an alternative, authentication database 404 can include additional information, such as the polling location from which the biometric information was input/received, time received, and/or voter identification information (e.g., name, social security, electronic signature, etc.). Of course, it should be apparent to those skilled in both the computer and voting arts that the authentication described herein can be used in combination with other authentication techniques, including a voter sign-in sheet, for example.

Referring also to FIG. 2, at step 203, a determination is made whether or not a match was found. If a match is found, processing continues at step 206 to deny authorization and to provide notification of the voter authentication failure. Notification can be made to the voter, and one or more other individuals (e.g., poll worker, election official, law enforcement, etc.). If it is determined, at step 203 of FIG. 2, that the voter's biometric information did not match biometric information of a person who has already cast a ballot, processing continues at step 204 to authorize the voter to vote, and to provide notification (e.g., to the voter and poll workers) that the voter authentication was successful. In addition at step

205, the voter's biometric information is stored in database 404, and processing continues at step 103 to allow the voter to enter his ballot selections.

Referring again to step 105 of FIG. 1, after the voter casts his ballot, a voting record identifier is generated. FIG. 3 provides a voting record generation process flow for use in one or more embodiments of the present disclosure. Generally, a request to generate a voting record identifier is received from a polling location. As discussed herein, such a request can be processed by a server using databases 402 and 404. As is discussed herein, a voting record identifier can be generated at a central location and a "master" copy of database 402 can be centrally maintained. Also, database 402 can be replicated to a number of locations. In response to a request, a voting record identifier is generated, and an association is created between the voting record identifier and a voter's ballot selections. The voting record identifier, a voter's ballot selections and an association between these items of information is stored in database 402. Two or more simultaneous requests can be received. In such a case, the requests can be processed according to a determined priority, which is arbitrarily assigned based on any number of priorities such as time, location, or another priority determined by a person of ordinary skill in the art. As discussed above, and claimed below, artisans will readily understand how and why priority is set according to the embodiments disclosed, contemplated and claimed according to the instant teachings.

Referring to FIG. 3, at step 301 a determination is made whether or not a voter record identifier request is received. If not, processing continues to check for such a request. If a request is received, processing continues at step 302 to determine whether or not two or more simultaneous requests were received. For example, and when a request is received, it can be assigned a time stamp. The time stamp can be a time-of-day stamp alone or in combination with a date stamp, for example. As a further example, a received request can include a time stamp. In either case, the determination made at step 302 can include an examination of a received request's associated time stamp in order to identify multiple simultaneous requests. Once again, the exemplary embodiment disclosed is not meant to limit, rather provide a way for those skilled to understand how multiple requests work.

If it is determined that multiple simultaneous requests were received, processing continues at step 303 to prioritize the requests. In accordance with this exemplary embodiment, the requests are prioritized using information contained in a prioritization database, such as database 404 of FIG. 4. The information associated with a request can be a unique identifier which is used to prioritize a request relative to the other simultaneous requests. For example, the unique identifier can comprise an identifier associated with the electronic voting system used by a voter to enter his ballot selections. In this exemplary embodiment, simultaneous requests are prioritized based on a geographic location of the electronic voting system used by a voter to cast his vote. To illustrate by way of an example, a request that identifies an electronic voting system located in New York, N.Y. can be given priority over an electronic voting system located in Los Angeles, Calif.

In a case that simultaneous requests are prioritized based on a geographic location of an electronic voting system, database 406 includes, for each electronic voting system, its unique identifier, a geographic location (e.g., a polling location, precinct number, etc.) and prioritization information (e.g., a value that represents an order by which sequence identifiers are to be assigned to a voter's ballot selections). Those skilled likewise understand that being prioritized with a local sequence identifier supports resolution of temporally identical sequences when combined with unique identifiers associated with each computing system used by a voter. As an alternative and in a case that prioritization is based on identification information associated with a given electronic voting system without reference to a geographic location, it is possible to eliminate the geographic location information in data base 406. In such a case, an electronic voting system's unique identifier is associated with prioritization information, without mapping the electronic voting system to a geographic location.

In any event, referring again to FIG. 3, prioritization information for each of the simultaneous requests is retrieved from database 406 using the unique identification information associated with a given request. At step 304, the requests are prioritized, and the sequence identifiers are assigned, based on the retrieved prioritization information.

Whether or not a determination is made, at step 302, that multiple requests were received, steps 305 to 307 are performed for a given request. More particularly, at step 305, a first request, or a next request (in a case that a subsequent one of the multiple simultaneous requests received is to be processed), is retrieved. At step 306, a voting record identifier is generated in response to a received request. At step 307, the voting record identifier generated at step 306 is stored in database 402, with an association between the voting record identifier and the voter's ballot selections.

At step 308, a determination is made whether or not any received requests remain to be processed. In a case that multiple simultaneous requests were received and one or more of these requests remain to be processed, processing continues at step 305 to process the remaining requests. In a case that a single request was received or the last of the simultaneous requests has been processed, processing continues at step 101 for another voter.

Referring again to FIG. 4, copies of databases 402 and 406 can be replicated to more than one location, and accessed via a network (e.g., local area network, wide area network, the Internet, and any other appropriate system). While database 404 can be replicated, one copy, e.g., a "master" copy can contain the most up-to-date information, and this copy is updated with newly received biometric data. A local replication of database 404 can be initially searched for a match. If the local copy does not identify a match, the "master" copy is searched for a match. If the local copy contains a match, there is no need to access the "master" copy. Use of a replicated copy can therefore provide load balancing, and reduce network traffic to, a centralized location, for example.

In addition to its use by a voter to confirm his vote or in a post-election audit, it should be apparent that database 402 can be used in other ways. For example, database 402 can provide "up-to-the-minute" voting results; when and/or where such reporting is permitted. For example, a news agency or other entity can access database 402 to tally the votes cast, so as to provide virtually real-time reporting on the election (e.g., the number of voters who voted for a candidate or ballot initiative). Using the voting record identifier, it is possible to identify the number of registered voters who voted in the election. In addition, it should be apparent that the data contained in database 402 can be presented in a number of ways. For example, it is possible to generate a report which lists the voting record identifiers associated with a given ballot selection (e.g., the voting record identifiers associated with a vote for a given candidate or ballot initiative). Such a report can be used by a voter to confirm his vote and by another entity to confirm a vote count by ballot selection.

It is likewise noted that an important feature of the present invention includes the use of confirmation codes, as discussed. Expressly incorporated by reference, as is fully set forth herein are U.S. Pat. Nos. 6,694,045 and 6,968,999 as if they were fully set forth here, as confirmation codes are generated in numerous business transactions including on-line bill payments, airline reservations and the instant teachings accomplish secret balloting by not identifying voters while providing a generated code based on voting systems used on the real-time event of the vote.

Similarly, by using unique personal computer identification codes, encoded on CPU's or systems themselves in combination with timing and dating data, the instant teachings incorporate existing ways to use input confirmation codes in voting.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. An electronic voting system comprising in combination:

a plurality of electronic voting subsystems including at least one server coupled to a plurality of computers and at least one electronic voting software packages;

said electronic voting subsystems linked by a computer network, wherein at least one of said computers receives ballot selections as input from a voter;

said electronic voting subsystem saving said ballot selections and generating a voting record identifier in response to, and associated with said, ballot selections, said voting record identifier and said associated ballot selections being electronically available;

wherein said voting subsystem receives voter authentication information by sensing a physical characteristic of said voter at the time said ballot selections in an election are input, and wherein said voting subsystem compares said received voter authentication information with stored voter authentication information from a plurality of voters in said election;

said voting subsystem generating a notification that authentication was successful when a match is not found; and said voting subsystem generating a notification that authentication failed when a match is found.

2. The electronic voting system of claim 1, wherein said stored voter authentication information comprises voter biometric information that is associated with a measurable characteristic of said voter who input said ballot selections, said voter biometric information not being associated with personal information revealing the identity of said voter.

3. The electronic voting system of claim 2, wherein said voting subsystem determines a voter's voting sequence based on a determined data set, said data set including the relative time said ballot selections were input and the identity of said computer receiving said ballot selections.

4. The electronic voting system of claim 3, wherein said voter sequence is also based on a geographic location of said computer receiving said ballot selections.

5. The electronic voting system of claim 1 wherein said voting record identifier further comprises a voting sequence number indicating the sequence of said received ballot selections from said voter with respect to other ballot selections received from other voters.

6. The electronic voting system of claim 1 wherein said voting subsystem provides said voting record identifier to said voter when said ballot selection is made and provides said ballot selections associated with said voting record identifier to said voter upon request by said voter only if said voter provides said voting record identifier.

7. The electronic voting system of claim 1 wherein said voter's personal information is not associated with said ballot selections.

8. The electronic voting system of claim 1 wherein said electronic voting software package operates in a general purpose computer.

9. A voter authentication method comprising:

sensing a physical characteristic of a plurality of voters who have voted during an election;

using said sensed physical characteristic of a plurality of voters to generate authentication information, said authentication information not identifying any voter's identity;

sensing a physical characteristic of a target voter;

using said sensed physical characteristic of said target voter to generate target authentication information, said target authentication information not identifying said target voter's identity;

comparing said target authentication information with said authentication information; and generating a notification to indicate that said target voter is authorized to vote if said target authentication information does not match said authentication information.

10. The method of claim 9, wherein said sensed authentication information and said sensed target authentication information is biometric information and wherein said biometric information comprises at least one of fingerprint information, palm print information, facial scan information, eye scan information and voice pattern information.

11. The method of claim 9 further comprising:

generating a notification that said target voter is not authorized to vote if said target authentication information matches said received and stored authentication information; and preventing said target voter from voting.

12. A method of processing votes comprising:

sensing a biometric from a voter at a polling location during an election;

determining that the voter is eligible to vote only in response to a determination that the biometric received from the voter does not match any of a plurality of biometrics from a plurality of voters in said election, thereby indicating that the voter has not yet voted;

receiving a ballot selection from said voter at said polling location;

generating and storing a voting record identifier in response to said received ballot selection; and providing said voting record identifier to said voter.

13. The method of claim 12 further comprising:

receiving a request for said ballot selection, said request including said voting record identifier; and providing said ballot selection in response to said request.

14. The method of claim 13 wherein said request is received electronically.

15. The method of claim 12 further comprising repeating said receiving and generating for a plurality of additional ballot selections from additional voters.

16. The method of claim 12 further comprising storing said ballot selection in at least one database, said database including a mapping between said ballot selections and said voting record identifier.

17. The method of claim 16 wherein said database does not contain a mapping between said ballot selections and information relating to the identity of said voter.

18. The method of claim 12 wherein said voting record identifier is not associated with the personal identity of said voter.

19. A method for electronic voting comprising:

receiving and storing electronic ballot selections from a plurality of voters;

determining a priority among any votes received simultaneously from said plurality of voters;

generating and storing a confirmation code in response to said received ballot selection; and providing said confirmation code to said voter, wherein said confirmation code includes a sequence identifier indicating the order of said receiving of said electronic ballot from said voter with respect to electronic ballots received from other voters.

20. The method of claim 19 further comprising:

receiving a post-election request from said voter through a computer network for said stored ballot selection, wherein said request includes said confirmation code; and providing said ballot selection to said voter through said computer network.

21. The method of claim 19 wherein said determined priority is based on a geographic location of said voter when producing said electronic ballot selection.

22. The method of claim 19 wherein said storing comprises storing said electronic ballot selection in a database and said providing comprises providing read-only access to said database.

23. An article of manufacture for use in a computer system tangibly embodying computer instructions executable by said computer system to perform process steps for processing votes comprising:

receiving a ballot selection from a voter;

generating a confirmation code associated with said received ballot selection; and storing said ballot selection and said confirmation code such that said ballot selection can be retrieved with said confirmation code wherein said confirmation code includes a voting sequence identifier containing information relating to the sequence of said ballot selection with respect to ballot selections from other voters, said voting sequence being based on the geographic location of said voter.

24. An electronic voting system comprising in combination:

a plurality of electronic voting subsystems including at least one server coupled to a plurality of computers and at least one electronic voting software packages;

said electronic voting subsystems linked by a computer network, wherein at least one of said computers receives ballot selections as input from a voter;

said electronic voting subsystem saving said ballot selections and generating a voting record identifier in response to, and associated with said, ballot selections, said voting record identifier and said associated ballot selections being electronically available;

wherein said voting subsystem receives voter authentication information by sensing a physical characteristic of said voter at the time said ballot selections in an election are input, and wherein said voting subsystem compares said received voter authentication information with stored voter authentication information from a plurality of voters in said election;

said voting subsystem generating a notification that authentication was successful when a match is not found; and said voting subsystem generating a notification that authentication failed when a match is found, wherein the personal identity of said voter remains anonymous.

25. A method for electronic voting comprising:

receiving and storing electronic ballots selections from a plurality of voters;

determining a priority among any votes received from said plurality of voters;

generating and storing a confirmation code in response to said received ballot selection; and providing said confirmation code to said voter, wherein said confirmation code includes a sequence identifier indicating the order of said receiving of said electronic ballot from said voter with respect to electronic ballots received from other voters.

* * * * *